United States Patent
Duboy

(10) Patent No.: US 8,720,856 B2
(45) Date of Patent: May 13, 2014

(54) VALVE WITH A TWO-PIECE SEALING GASKET

(75) Inventor: Dominique Duboy, Gradignan (FR)

(73) Assignee: KSB S.A.S., Gennevilliers Cedex (FR)

( * ) Notice: Subject to any disclaimer, the term of this patent is extended or adjusted under 35 U.S.C. 154(b) by 0 days.

(21) Appl. No.: 13/701,865

(22) PCT Filed: May 4, 2011

(86) PCT No.: PCT/FR2011/000272
§ 371 (c)(1),
(2), (4) Date: Dec. 4, 2012

(87) PCT Pub. No.: WO2011/151533
PCT Pub. Date: Dec. 8, 2011

(65) Prior Publication Data
US 2013/0087734 A1    Apr. 11, 2013

(30) Foreign Application Priority Data
Jun. 4, 2010 (FR) .................................. 10 02373

(51) Int. Cl.
*F16K 25/00* (2006.01)

(52) U.S. Cl.
USPC ............ 251/192; 251/306; 251/357; 251/360

(58) Field of Classification Search
USPC ................ 251/173–174, 192, 306–307, 357, 251/360–363, 368; 137/601.06
See application file for complete search history.

(56) References Cited

U.S. PATENT DOCUMENTS

| | | | | |
|---|---|---|---|---|
| 2,846,999 A | * | 8/1958 | Loewenheim, Ernst | 126/292 |
| 3,746,042 A | * | 7/1973 | Finkel | 137/601.06 |
| 3,834,663 A | * | 9/1974 | Donnelly | 251/173 |
| 3,945,398 A | * | 3/1976 | Masheder | 137/527.8 |
| 4,231,546 A | * | 11/1980 | Eggleston et al. | 251/173 |
| 4,296,915 A | * | 10/1981 | Baumann | 251/306 |
| 4,395,050 A | * | 7/1983 | Wirz | 251/174 |
| 4,541,328 A | * | 9/1985 | Brzezinski et al. | 454/336 |
| 4,766,807 A | * | 8/1988 | Davis | 454/333 |
| 5,580,307 A | * | 12/1996 | Arosio et al. | 454/336 |
| 5,620,167 A | * | 4/1997 | Habicht | 251/306 |
| 5,655,752 A | * | 8/1997 | De Villepoix et al. | 251/359 |
| 5,669,350 A | * | 9/1997 | Altmann et al. | 251/306 |
| 5,934,647 A | * | 8/1999 | Marbach | 251/306 |
| 6,027,126 A | * | 2/2000 | Peterschmitt et al. | 277/644 |
| 6,047,951 A | * | 4/2000 | Ito et al. | 251/308 |
| 6,412,755 B2 | * | 7/2002 | Ito | 251/306 |

FOREIGN PATENT DOCUMENTS

DE            27 06 529 A1    8/1978

* cited by examiner

*Primary Examiner* — John Bastianelli
(74) *Attorney, Agent, or Firm* — Renner, Kenner, Greive, Bobak, Taylor & Weber

(57) ABSTRACT

Valve comprising a gasket interposed between a body (1) and a closure member (2), which is in two pieces (6), each piece (6) has a curved part (12), and the two pieces are fixed within the body (1) and within the closure member (2), in such a way as to come into contact via the convex face of their curved part (12).

8 Claims, 4 Drawing Sheets

VALVE WITH A TWO-PIECE SEALING GASKET

The present invention relates to valves comprising an annular sealing gasket made of flexible sheet-metal which is interposed between a body and a closure member. It relates, very particularly, to butterfly valves with triple off-centring which thus have off-setting of the operating shaft of the butterfly in relation to its plane, off-centring of the operating shaft of the butterfly in relation to the axis of the piping and inclination of the machining cone of the body and/or of the butterfly.

These valves with triple off-centring make it possible to reach a service pressure of up to 100 bar and are satisfactory when the pressure to be sealed is applied in the pressure-sealed direction of the closure member. This side is generally also called the "preferential direction".

The leakage values found in this configuration commonly range between 1 and 0.1 Ncm$^3$/mn per millimeter of diameter of the butterfly.

In these constructions, when the pressure is applied in the opposite direction, which is referred to as the "non-pressure-sealed direction", the sealing performance is generally lower, the leakage commonly being equivalent to twice that found in the pressure-sealed direction. These valves are therefore not completely bidirectional.

That is particularly true in the case of all metal gaskets which simultaneously bring about static sealing between themselves and the support for the gasket, and dynamic sealing between themselves and the sealing seat. This applies whether the gaskets are solid, as in the following patents: FR2674599, EP0145632, DE10250774, FR2698147 and DB2057305, or else lamellar, as in patents FR2773202 and U.S. Pat. No. 3,945,398.

The main reason for this difference in behaviour is that the powerful clamping of the gasket for the purpose of obtaining static sealing greatly impedes the freedom of the gasket to bring about the contact pressure against the seat for dynamic sealing.

Where sheet-metal sealing gaskets are used, as in the following patents: GB1536837, FR2751716 and EP0166641, static sealing is correctly brought about and the flexibility of the gasket brings about, also correctly, dynamic sealing in the pressure-sealed direction. However, this same flexibility greatly impedes sealing in cases where the pressure is applied in the non-pressure-sealed direction, because of the displacement of the gasket.

In the prior art, gaskets are found which separate the static-sealing function from the dynamic-sealing function. This is explained particularly clearly in the following patents: FR2398940, FR2615580 and FR2497905. This technology has the advantage of bringing about complete static sealing but suffers from one major drawback: the guaranteed sealing of 0.1 to 1 Ncm$^3$/mn for a linear length of one millimeter of gasket diameter only applies up to 25 bar in dynamic sealing. Moreover, the forces developed at pressures greater than 25 bar induce contact stresses and coefficients of friction between the rolled metal sheet and the seat which lead to the unrolling of the external metal sheet and therefore to the destruction of the gasket.

The object of the invention is a valve which is capable of sealing off service pressures of up to 100 bar with a level of sealing better than 0.1 Ncm$^3$/mn per millimeter of diameter of the closure member, said sealing being equivalent in the pressure-sealed direction and in the non-pressure-sealed direction.

This is achieved, according to the invention, by means of a valve comprising an annular sealing gasket made of flexible sheet-metal which is interposed between a body and a closure member, characterised in that the gasket is in two pieces; each piece, which is in a single piece, is fixed by means of a fixing part, one to the body, the other to the closure member; each piece has a curved part, the curved part of one of the pieces facing towards the right and that of the other piece facing towards the left; and the pieces are fixed within the body and the closure member in such a way as to come into contact via the convex face of their curved part.

In the majority of cases where the various concepts for sealing butterfly valves are applied, the proposed solutions take account of the behaviour of the pieces on the assumption that the body and the butterfly which are subjected to the pressure are specified so as to be resistant and are assumed to be non-deformable. In reality, the situation is entirely different. The fact is, any piece which is subjected to external stresses deforms. It may be possible to disregard this physical phenomenon if the pieces are over-dimensioned, but said phenomenon can give rise to malfunctions which are insurmountable as far as the sealing is concerned.

This phenomenon has little or no effect when the pressures to be sealed off are lower than 25 bar, but when the said pressures reach 100 bar, either the deformations are unacceptable for sealing purposes, or else the over-dimensioning of the pieces leads to very thick butterflies which reduce the cross-section of passage of the fluid within the jet and therefore to losses of pressure which are unacceptable in the case of this type of valve.

The deformation, under a pressure of 16 bar, of a butterfly with a diameter of 1,000 millimeters is still acceptable, as it is less than 1 millimeter; that of each of the external flanges reaches values of the order of several millimeters (4.67 mm).

It will therefore be understood more clearly, under these circumstances, that the contact between the closure member, its sealing gasket and the seat is no longer brought about in a homogeneous manner and greatly disrupts the sealing of the valve.

Whereas there have always been provided, until now, one-piece gaskets which are fixed in either the body or the closure member for the purpose of obtaining static sealing, and are in contact with the other of these, i.e. the said closure member or the said body, for the purpose of obtaining dynamic sealing, thereby bringing about sealing within the core of the gasket as a result of its very continuity, the invention departs radically from this design by making up the gasket in two pieces, i.e. with a gap between said two pieces which will have to be rendered leakproof in order to obtain dynamic sealing, and by multiplying by two the static sealing to be realised, it being necessary to fix the gasket to both the body and the closure member, but with the advantage that the shutting-off of the gap between the two pieces of the gasket is effected between two pieces which are not obliged, as are the body and the closure member, to assume functions other than those of dynamic sealing. It is thus possible to realise and shape the two pieces in order to obtain the best possible dynamic sealing.

Satisfactory results have been obtained when the metal sheet has a thickness of between 1 and 4 millimeters.

It is possible to shape the two pieces of the gasket in such a way that the segments of the curved parts, via which the two pieces come into contact, have a radius of curvature representing from three to five times the thickness of the metal sheet. The radius of curvature may extend over an arc of 50 to 60°, while the curved parts extend over an angle of 270°.

According to one mode of embodiment which is particularly effective as regards sealing, the segment via which the curved parts come into contact is followed, in the direction that starts out from the fixing part, by a segment extending over an arc representing from five to fifteen times the thickness of the metal sheet and terminated by a straight segment, and is preceded, in the direction proceeding towards the fixing part, by an adjacent segment having a radius of curvature representing from five to fifteen times the thickness of the metal sheet, by a segment having a radius of curvature representing from three to five times the thickness of the metal sheet and by a segment having a radius of curvature representing from one to two times the thickness of the metal sheet.

In a preferred mode of embodiment, the valve is a butterfly valve with triple off-centring, and the body and the butterfly respectively define housings for fixing the parts for fixing the gasket, and stops for the ends of the straight section that terminates their curved parts.

The curved parts preferably come into contact while an angle of 1 to 5° remains before full closure is reached. This residual travel of 1 to 5° makes it possible to obtain pre-stressing of the two pieces of the gasket against one another when the valve is completely closed. This favours sealing at low pressures.

In the appended drawings, which are given solely on an exemplary basis:

FIG. 4 is a view illustrating the mounting and the pressure-less closing of the valve; while

Figure 1:
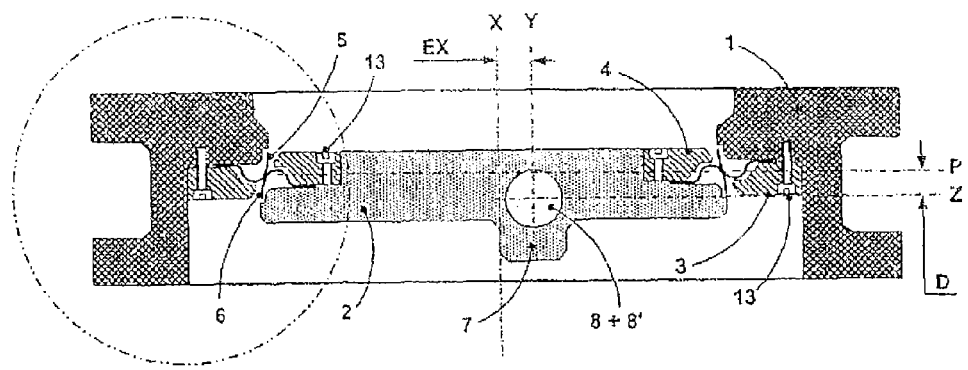
FIG. 1 is a view in section along a plane that passes through the axis of a pipe system belonging to a butterfly valve with triple off-centring which is mounted thereon.

Referring to FIG. 1, the butterfly valve represented comprises a body 1 of tubular shape having an inlet and an outlet through which the fluid is conveyed. The said body 1 is coaxial, along the axis X, with the piping which is connected to it.

Installed within the said body 1 is a closure member 2 in the form of a disc carrying two hubs 7, in which hubs there are located an upper operating shaft 8 and a lower pivot axis 8'. The closure member 2 is manoeuvred in rotation by the shaft 8 about the axis Y. The distance between the axis X and the axis Y defines the off-centring EX. On the other hand, the shaft 8 and the axis 8' are offset along the orthogonal axis Z from the sealing-contact plane P by a value D. This distance is called the "offset".

These two values EX and D are set so as to permit rapid disengagement of the contact between the sealing surfaces when the valve is opened, in order to limit friction, and therefore wearing of the sealing surfaces, to the maximum extent.

Figure 2:
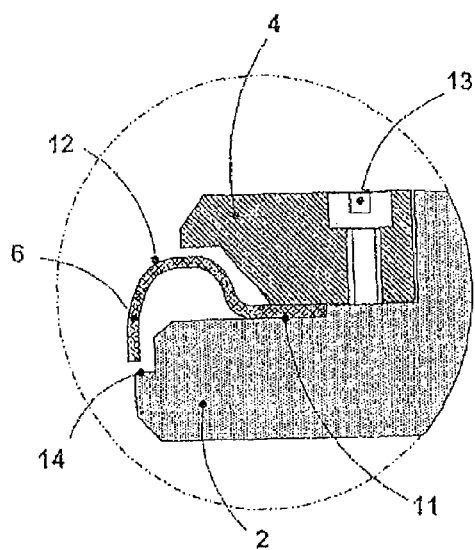
FIG. 2 is a view on a larger scale of part of FIG. 1.

As shown in FIG. 2, the closure member 2 is provided with a housing which makes it possible to install a sealing gasket 6 made up of a metal sheet which is shaped in accordance with a profile made up of a flat, circular part 11 in the shape of a crown and a curved part 12. The flat part 11, which is clamped between the counter-flange 4 and the butterfly 2 by the clamping screws 13, brings about static sealing. The curved part 12, which converges with the sealing gasket 5 located on the body 1, brings about dynamic sealing. A shoulder 14 provided in the closure member 2 makes it possible to limit the deformation of the sheet-metal gasket 6.

Figure 3:
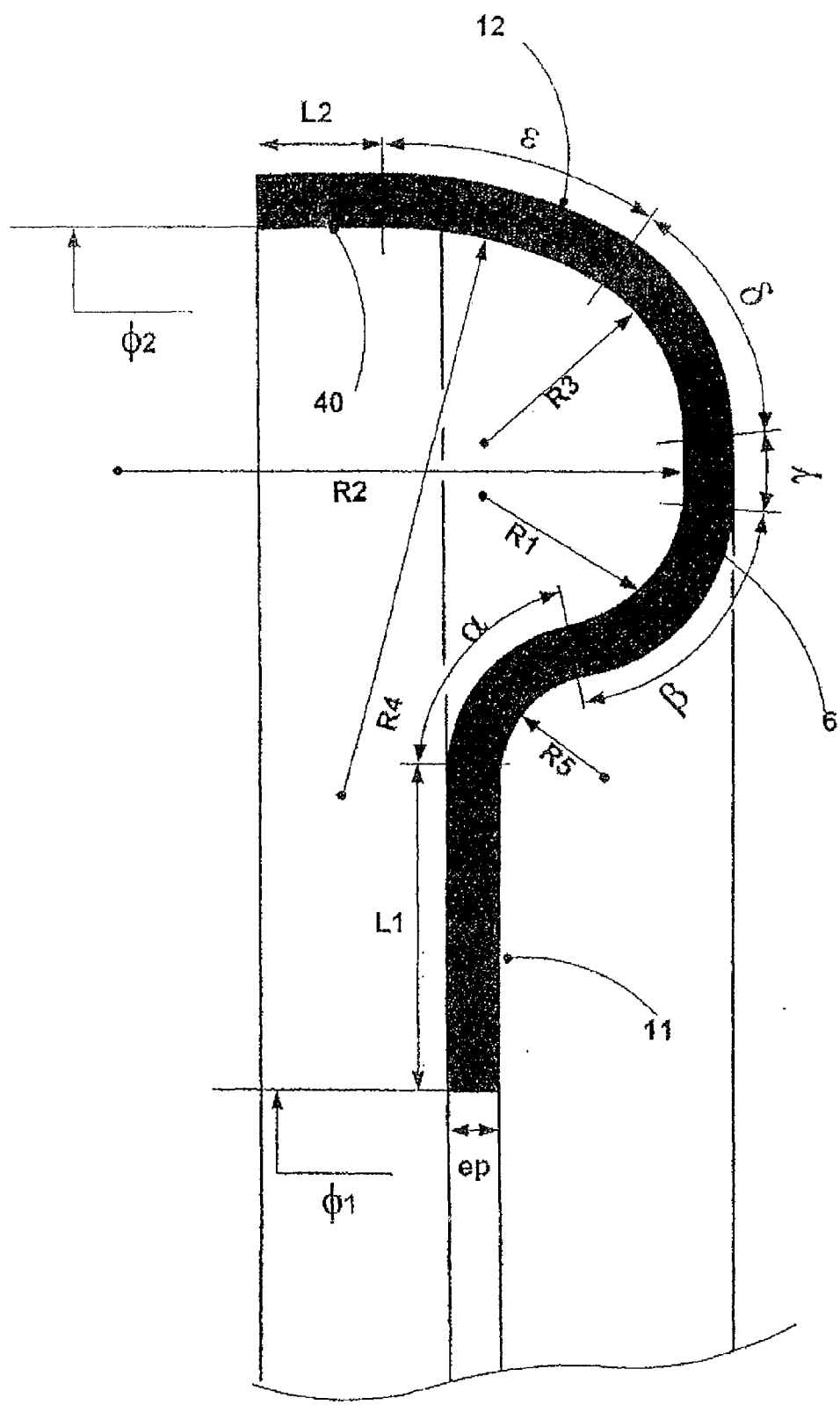
FIG. 3 is a view on a larger scale of one of the pieces that make up the gasket.

FIG. 3 shows the section of the gasket 6 in the curved part 12. The gasket 6, which is made of flexible sheet-metal and is located in the butterfly, is made up of a metal sheet which is profiled in the shape of a circular crown having a thickness ep of between 1 and 4 millimeters. The profile of this gasket, seen in section, is shown in FIG. 3.

The profile of this gasket is characterised by an internal diameter Ø1 corresponding to the external diameter of the housing of the butterfly 2 which is intended to receive the said gasket. Starting out from this internal diameter, the profile extends towards the outside of the butterfly via a straight segment L1 which is intended to form a flat face in the shape of a crown in order to bring about static sealing between the butterfly 2 and the counter-flange 4. The length of this segment is equivalent to five to ten times the thickness ep of the metal sheet.

Connected tangentially to this straight segment is the succession of arcs α, β, γ, δ and ε, the values of whose angles and respective radii R5, R1, R2, R3 and R4 are given below.

Extending tangentially at the end of the arc is a straight section L2 which is perpendicular to the straight section L1 and is equivalent to two to five times the thickness ep of the metal sheet.

The external diameter Ø2 is determined by the shoulder 14 provided in the butterfly 2.

The radius R5 is equivalent to one to two times the value of the thickness of the metal sheet ep. The said radius R5 is the minimum radius of folding, which is prescribed by the thickness ep and the sheet-metal material and by the method of obtaining the profile.

The radii R1 and R3 are substantially equal and are equivalent to three to five times the thickness ep of the metal sheet.

The radii R2 and R4, too, are substantially equal and are equivalent to five to fifteen times the thickness ep of the metal sheet.

The arc α forms an angle of approximately 90°.

The angle values of the arcs β, δ and ε are substantially equal and are equivalent to an angle of between 50 and 60°, while the angle of the arc γ is equivalent to 2 to 10°, in such a way that the sum of the angles of the arcs α, β, γ, δ and ε is equal to 270°, so as to obtain a completely orthogonal position of the straight sections L1 and L2.

That piece of the gasket which is located in the body is made up in the same way as that which is located in the butterfly.

Figure 4:
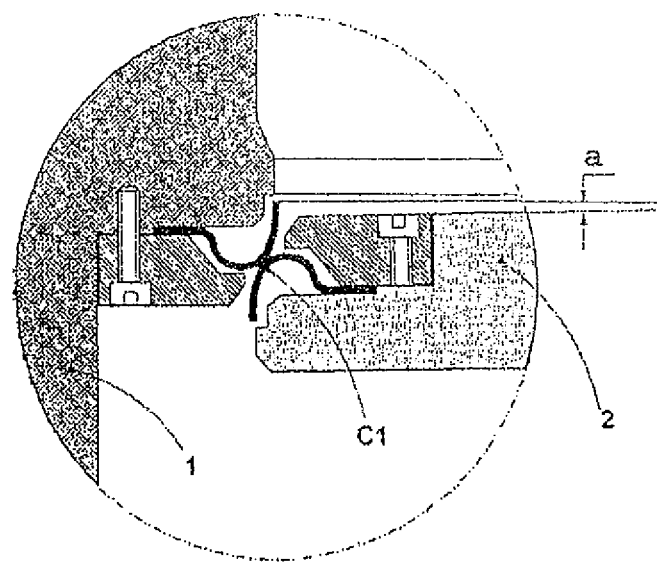

Referring to FIG. 4, it will be found that the construction of the valve, as put forward, prescribes that the manufacture of the sealing gaskets 5 and 6 makes provision for the dimensions of the curved parts to be such that the said gaskets come into contact with one another at the point C1, even before the closure member 2 has reached its full-closure position, and that an angle a of between 1 and 5° remains before its full closure is reached.

Figure 5:
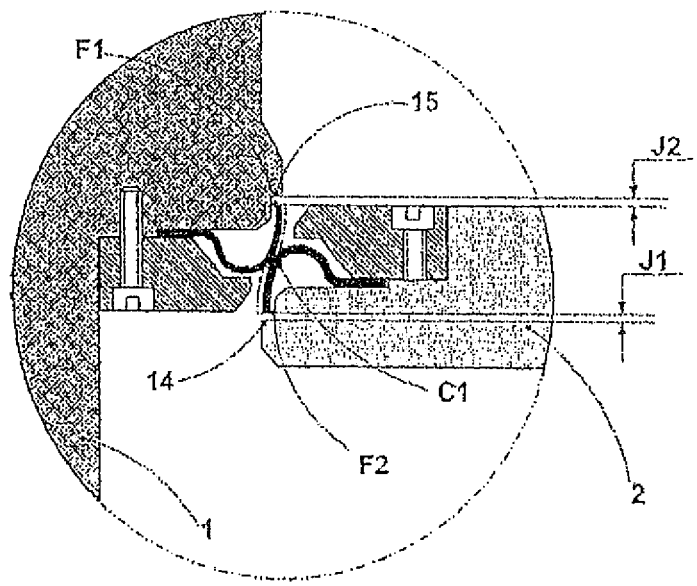
FIG. 5 shows the position of the pieces with the valve in FIG. 4 completely closed.

This residual travel of 1 to 5° makes it possible to obtain pre-stressing of the gaskets against one another, when the closed position is complete. FIG. 5 shows the valve when the closure member 2 is in the position of complete closure. It will be observed that the curved parts 12 have deformed by arrow values F1 and F2 respectively, under the effect of the contact C5 between the said two pieces. In this position, the sealing gasket belonging to the body 5 has a clearance J2 with the shoulder 15 on the body, while the gasket belonging to the closure member 6 has a clearance J1 with the shoulder 14 on the closure member 14.

Figure 6:
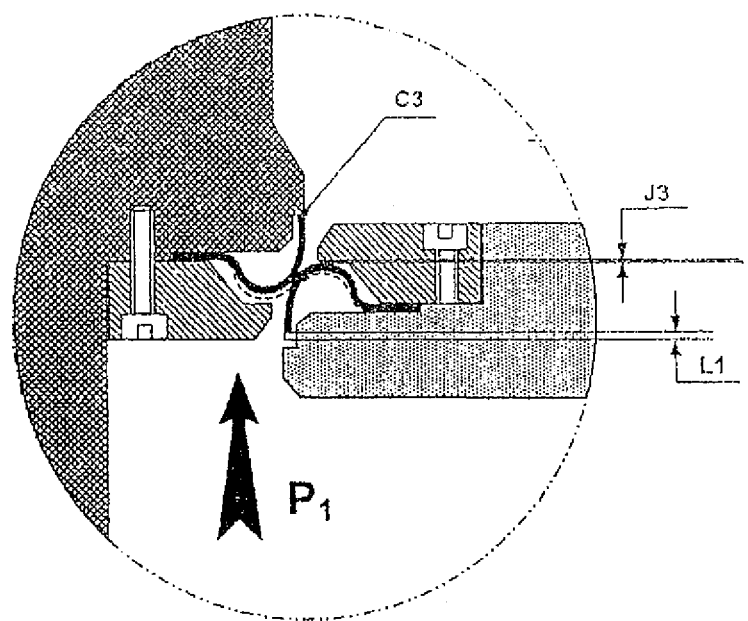
FIG. 6 shows the position of the pieces when a high pressure is set up on the upstream side.

According to FIG. 6, the valve, which is closed in this position, has sufficient pre-stressing between the two gaskets 5 and 6 to bring about sealing at low pressure; the said pressure being equivalent to between 3 and 10 bar. When a high pressure P1 is set up on the upstream side, the flexibility of the gaskets 5 and 6 will permit deformation and displacement by a value L1 until the gasket belonging to the body 5 reaches the contact C3 with the shoulder 15 on the body 1, while the gasket 6 belonging to the closure member 2 has a clearance J3 with the counter-flange 4. In this position, the contact pressure is at least equal to the high pressure P1, plus the pre-stressing which is equivalent to 3 to 10 bar. This guarantees complete sealing of the said valve in the pressure-sealed direction.

The behaviour of the valve is the same if the high pressure is applied downstream of the butterfly in the non-pressure-sealed direction.

The above description makes provision for the construction of the sealing gaskets in shaped sheet-metal. When the dimensions of the valves increase until they exceed one meter in diameter, the shaping tools become excessively expensive and the capacities of the stamping resources to be implemented become prohibitive. In order to mitigate this drawback, a mode of embodying solid gaskets according to the following description is proposed.

Figure 7:
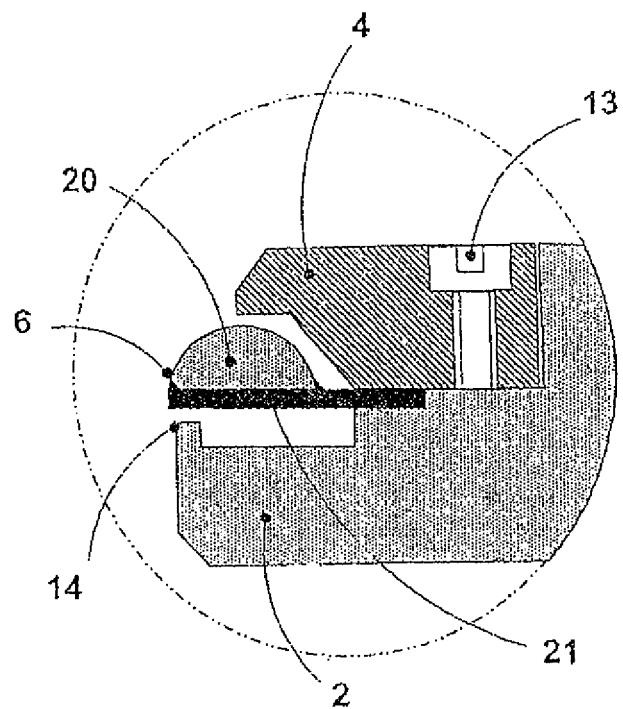
FIG. 7 is a view, similar to FIG. 2, of a variant of embodiment.

According to FIG. 7, it is possible to produce the gaskets from a disc of sheet-metal 21 onto which a solid ring 20 of semi-toric section is welded. The butterfly 2 is then machined in a different way in order to provide a shoulder 14 which will limit the deformation of the disc 21 when subjected to pressures.

In order to be able to utilise this type of gasket in all temperature areas, from cryogenics to heat-machine exhausts, these gaskets may combine any type of metallic materials.

In cryogenics and in the case of gaskets made of shaped sheet-metal, materials which retain acceptable mechanical characteristics down to −196° C. will be favoured, namely a highly alloyed stainless steel of the chrome/nickel/cobalt type. Its inherent characteristics, combined with heavy work-hardening due to the shaping of the metal sheets, impart to it satisfactory characteristics of elasticity at all temperatures.

In the case of the solid gaskets in the variant, the disc of sheet-metal 21 will be made of the same chrome/nickel/cobalt alloy, while the semi-torus 20 will preferably be made of a more malleable alloy such as an austenitic stainless steel of type 316 or 316L.

The invention claimed is:

1. Valve comprising an annular sealing gasket made of flexible sheet-metal which is interposed between a body (1) and a closure member (2), characterised in that the gasket:
   is in two pieces (5) and (6);
      each piece (5) or (6), which is in a single piece, is fixed by means of a fixing part (11), one to the body (1), the other to the closure member (2);
      each piece (5) or (6) has a curved part (12), the curved part of one of the pieces facing towards the right and that of the other piece facing towards the left; and
   the two pieces (5) and (6) are fixed within the body (1) and within the closure member (2) in such a way as to come into contact via the convex face of their curved part (12).

2. Valve according to claim 1, characterised in that the metal sheet has a thickness of between 1 and 4 mm.

3. Valve according to claim 2, characterised in that the segments of the curved parts, via which the two pieces come into contact, have a radius of curvature representing from three to five times the thickness of the metal sheet.

4. Valve according to claim 3, characterised in that the radius of curvature extends over an arc of 50 to 60°.

5. Valve according to claim 3, characterised in that the curved parts (12) extend along an angle of 270°.

6. Valve according to claim 3, characterised in that the segment (δ), via which the curved parts (12) come into contact, is followed, in the direction that starts out from the fixing part (11), by a segment (ε) extending over an arc representing from five to fifteen times the thickness of the metal sheet and terminated by a straight segment (40), and is preceded, in the direction proceeding towards the fixing part, by an adjacent segment (γ) having a radius of curvature representing from five to fifteen times the thickness of the metal sheet, by a segment (β) having a radius of curvature representing from three to five times the thickness of the metal sheet and by a segment (α) having a radius of curvature representing from one to two times the thickness of the metal sheet.

7. Valve according to claim 1, characterised in that the closure member is a butterfly valve with triple off-centring, and the body and the butterfly respectively define housings for fixing the parts (11) for fixing the gasket, and stops (15) for the ends of the straight segment (40) that terminates their curved part.

8. Valve according to claim 7, characterised in that the curved parts (12) come into contact while an angle (a) of 1 to 5° remains before full closure is reached.

* * * * *